Dec. 22, 1970  J. KUCH  3,548,688

DRILL

Filed Jan. 6, 1969

Inventor:
Josef Kuch
By
Walter Becker

United States Patent Office 3,548,688
Patented Dec. 22, 1970

3,548,688
DRILL
Josef Kuch, Kressbronn, Germany, assignor to Hawera Hartmetall-Werkzeugfabrik Ravensburg, Gesellschaft mit beschrankter Haftung, Ravensburg, Germany
Filed Jan. 6, 1969, Ser. No. 789,306
Claims priority, application Germany, Jan. 4, 1968, 1,652,675
Int. Cl. B23b 51/02
U.S. Cl. 77—70          15 Claims

ABSTRACT OF THE DISCLOSURE

A twist drill tip including chip grooves has a hard metal cutting head connected thereto; jaw coupling members and a centering element between the tip and twist drill include complementary conical mantle surfaces and centering protrusion recess interengaged positively at least in the direction of drill rotation; conical opening of the centering element has an angle in a range from 75 to 120°, preferably 90°. A circumferential angle of the jaw coupling member of the cutting head at least equals the circumferential angle located in the same plane and pertaining to the root of the jaw coupling member of the drill. Engaging surfaces of jaw coupling members are arranged approximately in an axial plane of symmetry of the drill located between the chip grooves of the drill. The end faces of the jaws of a jaw coupling member preferably of the cutting head and bottom surfaces of the jaw receiving recess of the other coupling member are located approximately in a plane perpendicular to the axis of the drill.

---

The present invention relates to a twist drill with a cutting head of the same cross-section of hard metal, said cutting head being connected to the tip of the drill by a suitable connection, as for instance soldering. The drill and the cutting head have those end faces thereof which face each other provided with means, such as coupling jaws, which interengage each other in a positive manner in the direction of rotation of the drill.

It is an object of the present invention so to design a twist drill of the above mentioned type that when the cutting head is properly aligned relative to the drill, a firm connection between these two parts will be assured.

This object and other objects and advantages of the invention will appear more clearly from the following specification in connection with the accompanying drawing, in which.

Figure 1:
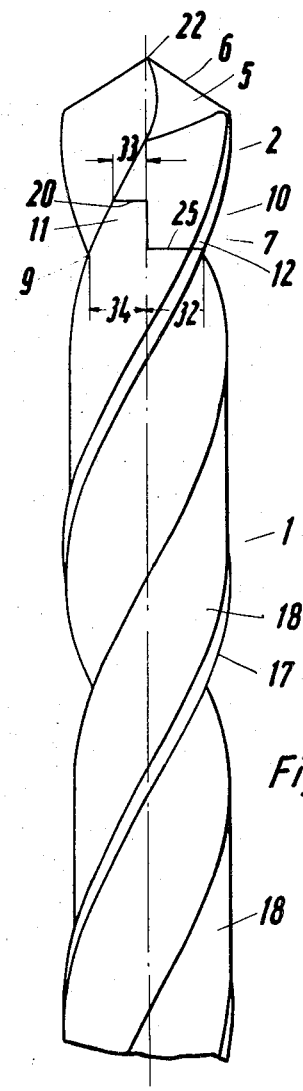
FIG. 1 is a view of a twist drill according to the present invention.

A twist drill with a cutting head of the same cross-section and made of hard metal which is connected to the tip of the drill by a corresponding connection, as for instance soldering, while the drill and the cutting head are at those end faces thereof which face each other provided with coupling means positively interengaging each other in the direction of rotation of the drill, is characterized according to the present invention in that for centering the cutting head with regard to the drill one of these two parts is provided with a centering member uniformly tapering toward the free end thereof, which centering member engages a corresponding centering recess while the mantle surfaces of said centering member and of the centering recess merge with the engaging surfaces of the positively interengaging members.

Such an arrangement makes possible a properly soldered connection while the two elements or members are of a simple and stable design and are properly centered with regard to each other. The solder or similar connecting material may pass also between those mantle surfaces which engage each other for centering purposes so that a firm and very uniform connection is obtained over the entire cross-section of the drill. In view of the tapering design of the centering member, no material reduction in the cross-section of the drill and tip of the drill is effected so that also drills of very small diameter can be designed in conformity with the present invention. The tapered design of the centering member also assures an automatic aligning of the tip of the drill with regard to the drill.

Referring now to the drawing in detail, the twist drill 1 has that end thereof which faces away from the shank (not shown) of the drill provided with a cutting head 2 the cross-section of which precisely corresponds to the cross-section of the drill 1 which is provided with two oppositely located spiral grooves 3, 4, said spiral grooves 3, 4 uniformly merging or being fully aligned with the spiral grooves in the cutting head 2. The cutting head 2 which consists of hard metal is in a manner known per se by means of ground surfaces 5 provided with cutting edges 6. As will be seen from FIGS. 1 to 4, the cutting head 2 and the drill 1 interengage each other by means of a self-centering jaw clutch 7 in such a way that they are positively interconnected in the direction of rotation indicated by the arrow 8.

The jaw clutch or coupling members 9, 10 of the drill 1 and of the cutting head 2 are provided at those end faces thereof which face each other and are designed complementary to each other so that those surfaces thereof which face each other are parallel to each other and engage each other over the entire surface. Each jaw coupling member 9 and 10 has two diametrically oppositely located protruding jaws 11 and 12 which are respectively provided with a catching surface 13, 14 which extend parallel to the axis of the drill in such a way that the axis of the drill is located in the plane of these catching surfaces 13, 14 and will be able to transmit a considerable torque. The surfaces 13, 14 are thus with regard to the axis of the drill designed as radial surfaces. The surfaces 13, 14 respectively extend up to the circumferential surface 15 of the twist drill and end at a distance from the axis of the drill which is greater than half the narrowest cross-section of the drill, in other words is greater than half the core thickness of the drill so that the narrowest cross-section of the twist drill will not be weakened by the jaw coupling members.

Figure 3:
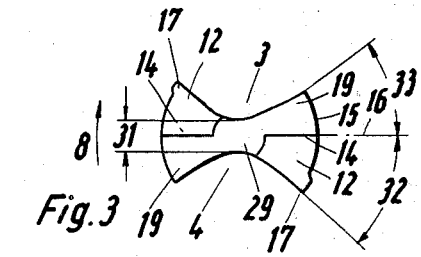
FIG. 3 represents an axial view of the coupling jaw means of the cutting head.
Figure 4:
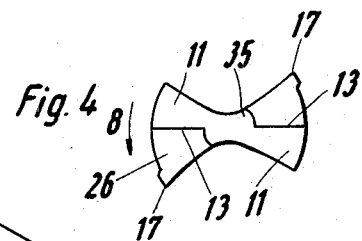
FIG. 4 is an axial view of the coupling jaw means of the drill.

As indicated in FIGS. 3 and 4, the catching surfaces 13, 14 are located approximately in the axial plane of symmetry 16 of the twist drill which plane 16 is located approximately between the spiral grooves 3, 4.

Each catching surface 13, 14 of each jaw coupling member 9, 10 faces the cutting edge or guiding edge 17 pointing in the direction of rotation of the drill and pertaining to the associated drill spiral 18.

In the cutting head 2, the jaws 12 engage that side of the associated drill spiral 18 which comprises the cutting or guiding edge 17, whereas the recesses 19 to be engaged by the jaws are provided therebehind when looking in the direction of rotation indicated by the arrow 8. The bottom surfaces 20 of these recesses 19 for the jaws 11 of the drill 1 have mantle lines 21 which are located on a cone which is coaxial to the axis of the drill and flares toward the tip of the drill, said cone having an angle of opening of approximately 90°. The end faces 22 of the jaws 11 of the drill 1 are complementary conical in the manner of an inner cone coaxial to the twist drill so that they have mantle lines 23 which are parallel to the associated mantle lines 21 of the cutting head 2. By means of the interengaging conical surfaces 20 and 22 of the cutting head 2 and the drill 1 respectively, the cutting head 2 is properly centered relative to the drill 1. Furthermore, the catching surfaces 13, 14 of the drill 1 and of the cutting head 2 due to the interengaging conical surfaces respectively have the form of a rectangular triangle. The hypotenuse of the triangularly shaped catching surface 13 of the drill 1 is formed by the corresponding outermost mantle line 23 of the end face 22 of the jaw 11, whereas one triangle side 24 located at a right angle thereto is formed by the circumferential surface 15 of the drill, and the third side of the triangle is formed by the bottom surface 25 of the jaw receiving recess 26 on the jaw clutch member 9 for the jaw 12 of the cutting head 2. Correspondingly, the hypotenuse of each triangular-shaped catching surface 14 of the cutting head 2 is formed by the corresponding outermost mantle line 21 of the bottom surface 20 of the jaw receiving recess 19 whereas a side 27 at an angle thereto is formed by the circumference 15 of the drill, and the third side of the triangle is formed by the end face 28 of the jaw 12. The angles formed by the various surfaces are relatively obtuse.

The end faces 28 of the jaws 12 of the cutting head 2 are with the embodiment illustrated in FIGS. 1 to 4 located in a plane perpendicular to the axis of the drill while the bottom surfaces 25 of the jaw receiving recesses 26 of the drill 1 are located in a corresponding plane. In this way, these surfaces 28, 25 intersect the cutting edges or guiding edges 17 of the drill spiral 18 at a relative obtuse angle. However, it is also possible to select the arrangement of the interengaging surfaces of the jaw coupling members as indicated in FIG. 1a. With this arrangement, the bottom surfaces 25a, 20a of the jaw receiving recesses of the drill and of the cutting head, as well as the associated end faces of the jaws are inclined with regard to the axis of the drill in such a way that the cutting head 2 will under the force of a weight be turned relative to the drill 1 in such a way that the catching surfaces 13, 14 are moved toward each other. This will be assured by the fact that the corresponding surfaces 20a, 25a opposite to the predetermined direction of rotation of the twist drill extend in the circumferential direction to the rear end of the drill at an incline, preferably at a small angle. Furthermore it is possible, as indicated by dot-dash lines in FIG. 1, to provide the catching surfaces 13a, 14a which engage each other and pertain to the coupling members of the drill and the cutting head respectively at such an incline with regard to the axis of the drill that the cutting edges under the normal load occurring when operating with the drill are exposed to a force component toward the shank of the drill. This will be assured by the fact that the surfaces 13a, 14a which engage each other extend preferably at a small angle inclination with regard to the axis of the drill toward the rear end of the drill in a direction opposite to the predetermined direction of rotation of the drill.

Figure 2:
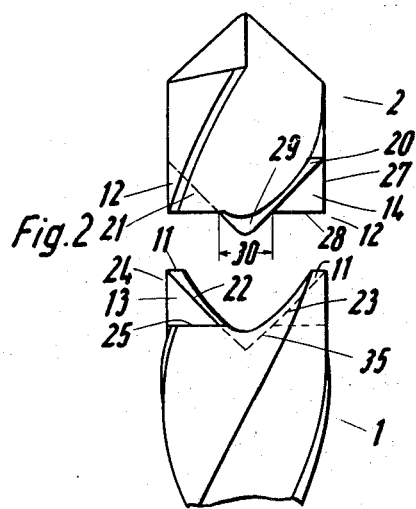
FIG. 2 shows the tip of the drill according to FIG. 1 but with the cutting head lifted off.

As will furthermore be evident from FIGS. 2–4, a protruding centering cone 29 is provided in the axis of the twist drill on the cutting head 2 for further improving the centering effect. The said centering cone 29 has its mantle lines 21 in common with the conical bottom surfaces 20 of the jaw receiving recesses 19 of the cutting head 2. The diameter 30 of the centering cone 29 when measured in the plane of the end faces 28 of the jaws 12 of the cutting head 2 is greater than the thickness of the core 31, in other words of the narrowest cross-section of the twist drill.

The centering cone 21 has associated therewith a corresponding conical centering recess 35 in the drill 1 which recess has its mantle lines in common with the end surfaces 22 of the jaws 11.

Figure 1A:
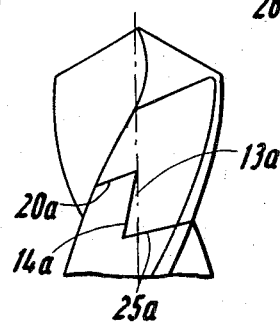
FIG. 1a shows a modification of the coupling jaws of FIG. 1.

As will furthermore be seen from FIGS. 1 and 3, the circumferential angle 32 of the end face 28 of the jaw 12 pertaining to the cutting head 2 is greater than the corresponding circumferential angle 33 of the bottom surface 20 of the jaw receiving recess 19 so that the jaw 12 at the root thereof has a relativly large cross-section and a high shear resistance. On the other hand, the circumferential angle 32 of the jaw 12 and the corresponding circumferential angle of the bottom surface 25 of the jaw receiving recess 26 of the drill 1 approximately equal the circumferential angle 34 measured in the same plane and pertaining to the root of the jaw 11 of the drill 1 so that also this jaw 11 has a relatively high shear resistance.

The jaw coupling members 9 and 10 which form one piece with the drill 1 and the cutting head 2 respectively may be produced in a simple manner by milling and/or grinding.

In order, when arranging the cutting head on the drill, not to be forced prior to the soldering to check that the cutting head is properly aligned with the drill, the interengaging profiles of the cutting head and of the drill are so designed that they precisely fit each other when engaging each other and being twisted relative to each other.

It is, of course, to be understood that the present invention is, by no means, limited to the particular showing in the drawing but also comprises modifications within the scope of the appended claims.

What I claim is:

1. A twist drill including chip grooves and comprising: a drill tip having a hard metal cutting head of the same cross section permanently connected thereto, said drill tip and said cutting head having those end faces thereof which face each other provided with members, as for instance jaw coupling members, which in the direction of rotation of the drill positively engage each other, and a centering element provided with one of said members for purposes of centering said cutting head relative to the drill by means of mantle surfaces, a centering recess located in the axis of the other of said members and tapering outwardly toward its free end, said centering element engaging the corresponding centering recess while the mantle surfaces of said centering element and the centering recess merge with the engaging surfaces of the positively interengaging members.

2. A drill according to claim 1, in which said centering element has conical mantle surfaces.

3. A drill according to claim 2, in which said centering element forms one piece with the adjacent positively engaging member.

4. A drill according to claim 3, in which said positively interengaging members form said mantle surfaces of said centering element and the centering recess respectively.

5. A drill according to claim 4, in which said mantle surfaces include end faces of the coupling jaws of one positively engaging member, preferably those of the drill, said end faces being conical in the manner of an inner cone, and bottom surfaces of the jaw receiving recesses also conically corresponding to the other positively engaging member in the manner of an outer cone.

6. A drill according to claim 1, in which said centering element in axial direction protrudes in part beyond the associated positive engaging member.

7. A drill according to claim 6, in which the protruding part of said centering element has common mantle lines with the conical surfaces of the associated positive engaging member.

8. A drill according to claim 6, in which the diameter of the protruding centering element in the plane of the end faces of the associated positive engaging member is larger than the narrowest cross-sectional width of the drill including particularly the core thereof.

9. A drill according to claim 7, in which the angle of opening of the cone of the centering element is in a range from 75 to 120°, preferably 90°.

10. A drill according to claim 1, in which a circumferential angle of the jaw coupling member of the cutting head at the end face of the jaw coupling member is larger than a corresponding circumferential angle of the bottom surface of the adjacent jaw coupling member receiving recess.

11. A drill according to claim 1, in which a circumferential angle of the jaw coupling member pertaining to the cutting head at the end face of the jaw coupling member equals the circumferential angle located in the same plane and pertaining to the root of the jaw coupling member of the drill.

12. A drill according to claim 1, in which each jaw coupling member is provided with a number of jaws which correspond to the number of the chip grooves of the drill, perferably each coupling member being provided with two diametrically oppositely located jaws.

13. A drill according to claim 12, in which said jaw coupling members have engaging surfaces arranged approximately in an axial plane of symmetry of the drill located between the chip grooves of the drill.

14. A drill according to claim 12, in which the end faces of the jaws of a jaw coupling member, preferably of said cutting head, and the associated bottom surfaces of the jaw receiving recess of the other coupling member are located approximately in a plane perpendicular to the axis of the drill.

15. A drill according to claim 1, in which said cutting head fits the drill when engaging the same and when twisted by 180° relative thereto.

References Cited

FOREIGN PATENTS 262,598   7/1913   Germany _____ 287—103D

FRANCIS S. HUSAR, Primary Examiner

U.S. Cl. X.R.

287—103